(12) United States Patent
Zhao et al.

(10) Patent No.: US 9,067,589 B1
(45) Date of Patent: Jun. 30, 2015

(54) HYBRID POWERTRAIN MODE DETERMINATION BASED ON SPATIAL DOMAIN ROUTE SEGMENTATION

(71) Applicant: FORD GLOBAL TECHNOLOGIES, LLC, Dearborn, MI (US)

(72) Inventors: Yanan Zhao, Ann Arbor, MI (US); Wei Liang, Farmington Hills, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/193,558

(22) Filed: Feb. 28, 2014

(51) Int. Cl.
*B60W 20/00* (2006.01)
*B60W 10/06* (2006.01)
*B60W 10/08* (2006.01)
*B60W 10/26* (2006.01)

(52) U.S. Cl.
CPC .......... *B60W 20/104* (2013.01); *B60W 20/106* (2013.01); *B60W 10/06* (2013.01); *B60W 10/08* (2013.01); *B60W 10/26* (2013.01); *Y10S 903/93* (2013.01)

(58) Field of Classification Search
USPC ......................................................... 701/22
See application file for complete search history.

(56) References Cited

U.S. PATENT DOCUMENTS

| | | | |
|---|---|---|---|
| 7,360,615 B2 * | 4/2008 | Salman et al. ........... 180/65.265 |
| 7,610,124 B2 * | 10/2009 | Wakashiro et al. ............. 701/22 |
| 7,958,958 B2 * | 6/2011 | de la Torre Bueno ..... 180/65.29 |
| 8,024,082 B2 * | 9/2011 | Richter et al. ................... 701/22 |
| 8,116,973 B2 * | 2/2012 | Soma et al. ..................... 701/425 |
| 8,140,204 B2 * | 3/2012 | Okubo et al. .................... 701/22 |
| 8,204,640 B2 * | 6/2012 | Tani et al. ........................ 701/22 |
| 8,269,641 B2 * | 9/2012 | Bauman et al. ............ 340/636.1 |
| 8,423,273 B2 | 4/2013 | Mineta |
| 8,433,466 B2 | 4/2013 | Yamada et al. |
| 8,571,748 B2 * | 10/2013 | Kluge et al. .................. 701/29.1 |
| 2010/0185349 A1 * | 7/2010 | Harada et al. ................... 701/22 |
| 2011/0114403 A1 | 5/2011 | Hauger et al. |
| 2012/0010767 A1 * | 1/2012 | Phillips et al. .................. 701/22 |
| 2012/0265409 A1 * | 10/2012 | Takeda ............................ 701/48 |
| 2012/0323413 A1 | 12/2012 | Kedar-Dongarkar et al. |
| 2013/0085651 A1 * | 4/2013 | Johannsson et al. ............ 701/93 |
| 2014/0012441 A1 * | 1/2014 | Wang et al. ..................... 701/22 |
| 2015/0039169 A1 * | 2/2015 | Dextreit .......................... 701/22 |

\* cited by examiner

*Primary Examiner* — Thomas Tarcza
*Assistant Examiner* — Alex C Dunn
(74) *Attorney, Agent, or Firm* — David B. Kelley; Brooks Kushman P.C.

(57) ABSTRACT

A vehicle includes a powertrain having an engine and an electric machine, and a battery configured to power the electric machine. The vehicle further includes a controller programmed to operate the powertrain according to a forecasted torque allocation between the engine and the electric machine. The controller generates forecasted torque allocation for each of a plurality of predetermined route segments based on predicted driver demand. The forecasted torque allocation is confirmed for each of the route segments based on a target battery state of charge corresponding to an endpoint of the route segment while an actual state of charge is within a threshold value of the target battery state of charge.

20 Claims, 8 Drawing Sheets

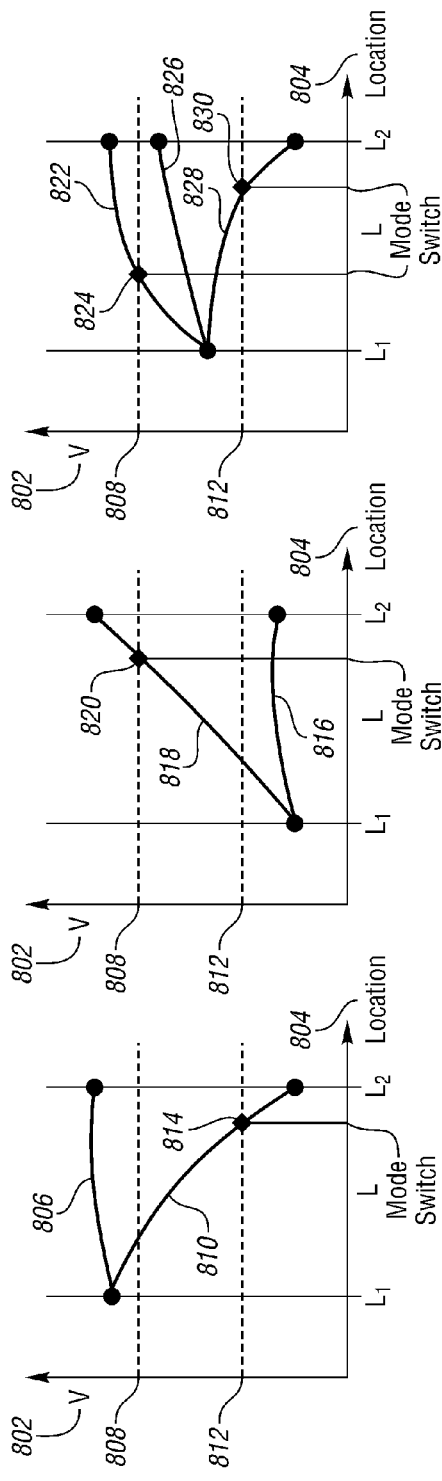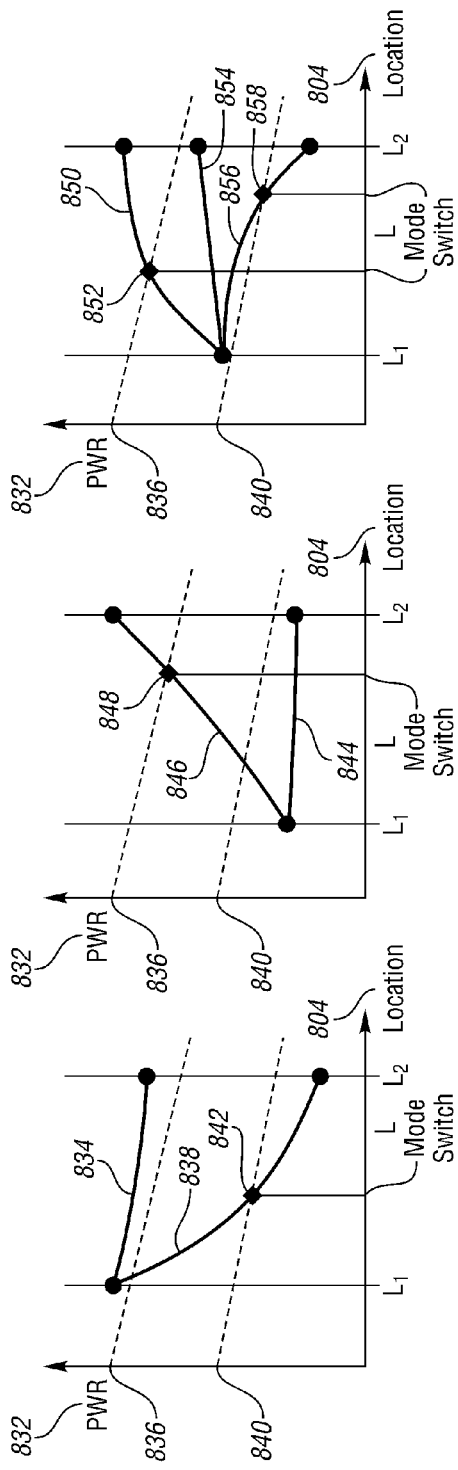

HYBRID POWERTRAIN MODE DETERMINATION BASED ON SPATIAL DOMAIN ROUTE SEGMENTATION

TECHNICAL FIELD

The present disclosure relates to hybrid vehicle powertrain control systems.

BACKGROUND

Hybrid Electric Vehicles (HEV's) may buffer fuel energy by using the internal combustion engine to turn a generator. The electricity produced by the generator may be stored in a battery. HEV systems can also recover kinetic energy by using the momentum of the vehicle to turn the generator. The electricity produced also may be stored in the battery. Fuel is the predominate initial source of energy in an HEV system. Plug-in Electric Hybrid Vehicles (PHEVs) are an extension of existing HEV's with added energy flexibility. A PHEV utilizes a larger capacity battery pack than a standard HEV and the PHEV has two initial sources of energy; fuel as well as electricity from the electric utility grid.

An objective of a HEV control system may be to minimize energy operational costs and emissions without compromising the vehicle drivability and system constraints. Energy management control strategies may operate the HEV in electric drive mode in which the vehicle is operated with only the electric motor providing propulsion to maximize the battery power output. In a hybrid operation mode, the vehicle is propelled by both the engine and the electric motor.

SUMMARY

In at least one embodiment, a vehicle includes a powertrain having an engine and an electric machine, and a battery configured to power the electric machine. The vehicle further includes a controller programmed to operate the powertrain according to a forecasted torque allocation between the engine and the electric machine. The controller generates forecasted torque allocation for each of a plurality of predetermined route segments based on predicted driver demand. The forecasted torque allocation is confirmed for each of the route segments based on a target battery state of charge corresponding to an endpoint of the route segment while an actual state of charge is within a threshold value of the target battery state of charge.

In at least one embodiment, a method for operating a hybrid-electric powertrain includes allocating a forecasted torque demand between a motor and an engine for a plurality of segments of a predetermined route based on one of a predicted vehicle speed and a predicted wheel power. The method further includes selectively activating the engine at locations along the predetermined route such that a target battery state of charge corresponding to an endpoint of each of the segments is achieved.

In at least one embodiment, a vehicle includes a powertrain having an engine and an electric machine, and a battery configured to power the electric machine. The vehicle also includes a controller programmed forecast a change in an activation state of the engine during any of a plurality of predetermined route segments in response to predicted driver demand changing during the route segment to cross a predetermined threshold. The controller is further programmed to monitor a state of charge of the battery, and forecast a torque output allocation between the engine and the electric machine such that a target state of charge is achieved at an endpoint of each of the predetermined route segments.

BRIEF DESCRIPTION OF THE DRAWINGS

FIGS. 9A through 9C are plots of several vehicle operating conditions corresponding to vehicle speed-based powertrain mode forecast.
FIGS. 10A through 10C are plots of several vehicle operating conditions corresponding to wheel power-based powertrain mode forecast.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
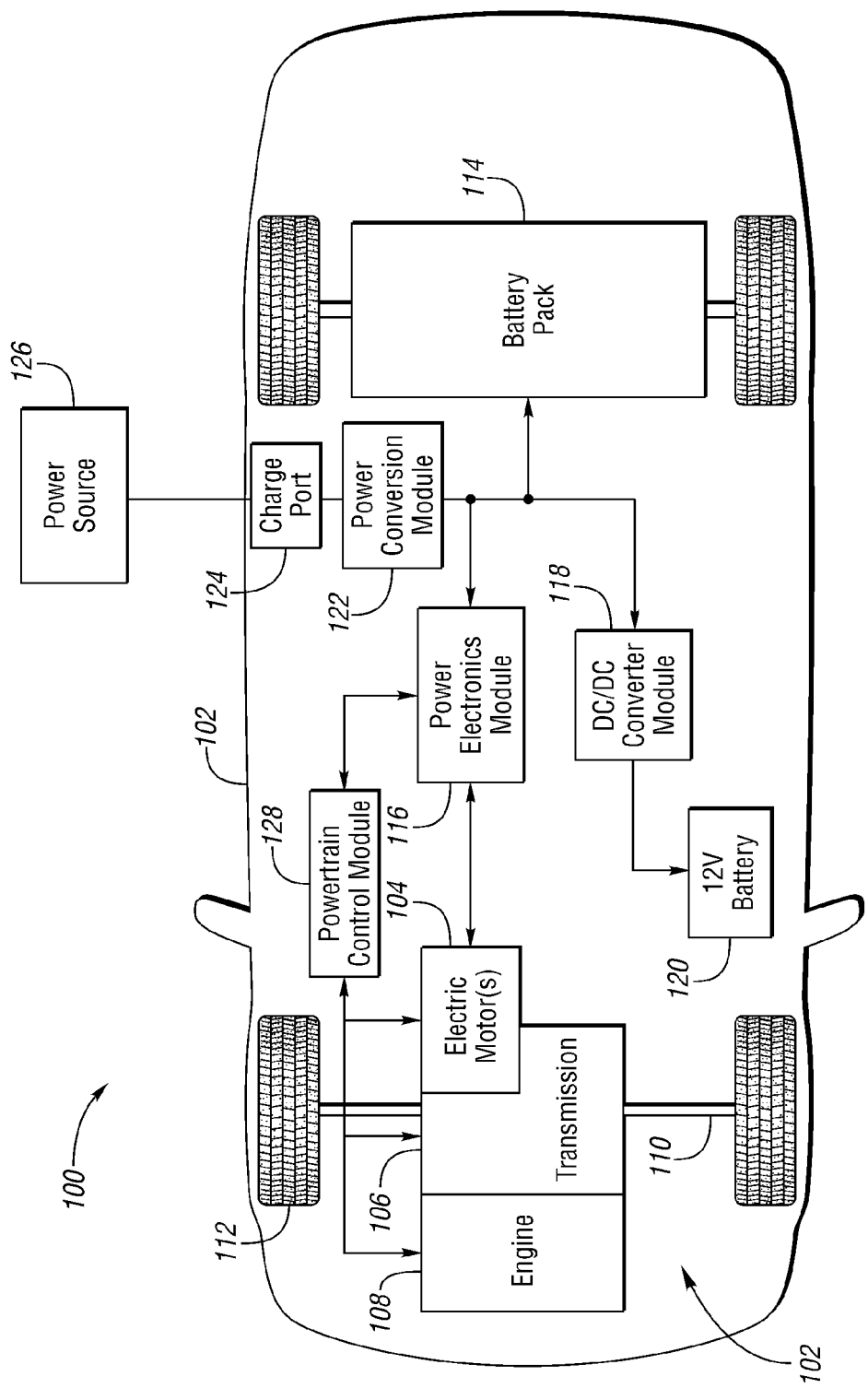
FIG. 1 is a schematic view of a hybrid-electric vehicle.

FIG. 1 depicts an example of a plug in hybrid-electric vehicle 100. A hybrid-electric powertrain 102 may comprise one or more electric machines, or electric motors 104 mechanically connected to a hybrid transmission 106. In addition, the hybrid transmission 106 is mechanically connected to an engine 108. The hybrid transmission 106 may also be mechanically connected to a drive shaft 110 that drives wheels 112. The electric motor(s) 104 can provide vehicle propulsion when the engine 108 is turned on, as well as when the engine is turned off. The electric motor(s) 104 can additionally provide vehicle deceleration by imparting a resistive torque upon the drive shaft. The electric motor(s) 104 may also be configured as electric generators and provide fuel economy benefits by recovering energy that would normally be lost as heat in the friction braking system. The electric motor(s) 104 may also reduce pollutant emissions since the hybrid electric vehicle 100 may be operated in an electric machine powertrain mode under certain conditions.

The traction battery, or battery pack 114, stores energy that can be used to power the electric motor(s) 104. A vehicle battery pack 114 is capable of providing a high voltage DC output. The battery pack 114 is electrically connected to a power electronics module 116. The power electronics module 116 is electrically connected to the electric motor(s) 104, and provides the ability to bi-directionally transfer energy between the battery pack 114 and the electric motor(s) 104. For example, the battery pack 114 may provide a DC voltage while the electric motor(s) 104 may require a three-phase AC current to function. In this case, the power electronics module 116 converts the DC voltage to a three-phase AC current to be received by the electric motor(s) 104. In a regenerative mode, the power electronics module 116 will convert the three-phase AC current from the electric motor(s) 104 acting as generators to the DC voltage required by the battery pack 114. The methods described herein are equally applicable to a pure electric vehicle or any other device using a battery pack.

In addition to providing energy for propulsion, the battery pack 114 may provide energy for other vehicle electrical systems. A DC/DC converter module 118 is capable of converting the high voltage DC output of the battery pack 114 to a low voltage DC supply that is compatible with low voltage vehicle loads. Other high voltage loads, such as compressors and electric heaters, may be connected directly to the high-voltage bus from the battery pack 114. The low voltage systems may also be electrically connected to a 12V battery 120. An all-electric vehicle may have a similar architecture but without the engine 108.

The battery pack 114 may be recharged by an external power source 126. The external power source 126 may provide AC or DC power to the vehicle 100 by electrically connecting through a charge port 124. The charge port 124 may be any type of port configured to transfer power from the external power source 126 to the vehicle 100. The charge port 124 may be electrically connected to a power conversion module 122. The power conversion module may condition the power from the external power source 126 to provide the proper voltage and current levels to the battery pack 114. In some applications, the external power source 126 may be configured to provide the proper voltage and current levels to the battery pack 114 such that the power conversion module 122 may not be necessary. For example, the functions of the power conversion module 122 may be contained in the external power source 126. The vehicle powertrain including engine, transmission, electric motors, electric generators and power electronics may be controlled by a powertrain control module (PCM) 128.

In addition to illustrating a plug-in hybrid vehicle, FIG. 1 can be representative of a battery electric vehicle (BEV) if the engine 108 is removed. Likewise, FIG. 1 can represent a traditional hybrid electric vehicle (HEV) or a power-split hybrid electric vehicle if the components 122, 124, and 126 are removed.

Path forecasting and path information for a given route can be used to optimize fuel economy of a HEV by scheduling in advance the battery State of Charge (SOC) target setpoints along the route. One strategy for this optimization can be performed by analyzing the overall route, separately optimizing for discrete locations along the route, and providing a planning signal based on the optimized operation to the PCM. The battery SOC target setpoints may be scheduled along the route by utilizing a path-dependent receding horizon control for real-time HEV energy management. This allows the system to obtain the optimal battery SOC scheduling by minimizing a cost function that represents the fuel consumption for predicted drive conditions of the intended route. In at least one embodiment a controller is programmed to monitor the SOC of the battery and plan operation modes for the powertrain along a route such that a target SOC setpoint value is achieved at the end of each route segment.

Figure 2:
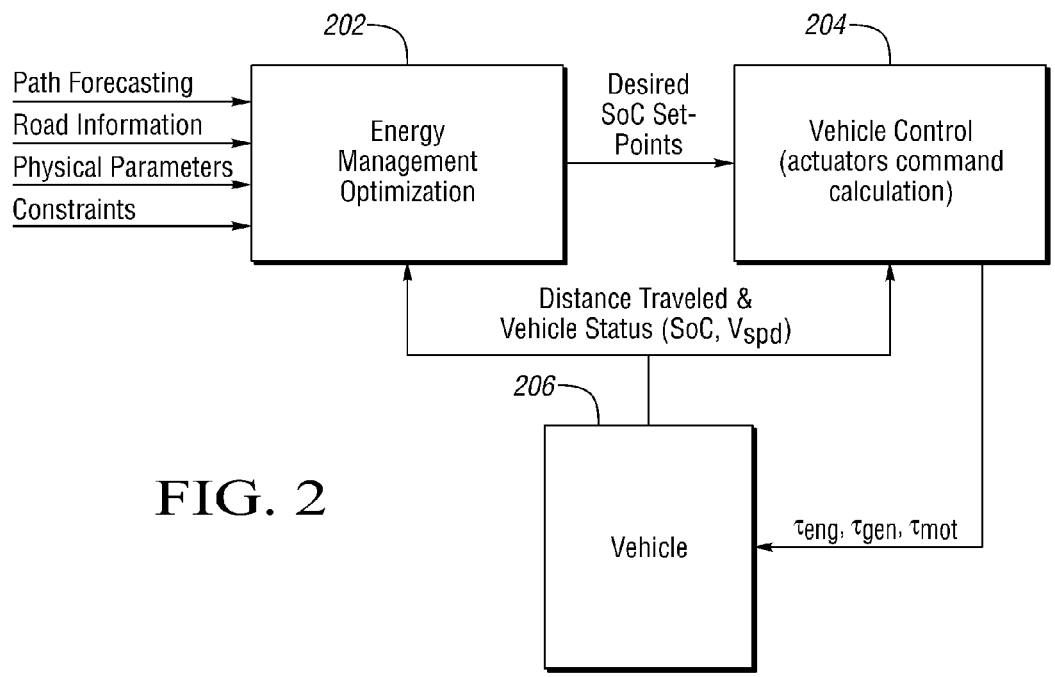
FIG. 2 is system diagram of a path forecasting based energy management control system.

FIG. 2 illustrates a method of decomposing the optimal HEV control system into two levels. A high level control shown as Energy Management Optimization 202 may generate the desired setpoints for the battery SOC along the route based on inputs including but not limited to path forecasting, road information, physical parameters, and general system constraints. A low level control shown as Vehicle Control 204 may track the battery SOC status and generate the desired vehicle operation parameters. For example, each of battery system power, engine power, rotational engine speed, and engine operation may be monitored by Vehicle Control 204. The Vehicle Control 204 calculates the torque commands for the Vehicle 206 to control the engine and electric machine(s). Torque commands (engine torque $\tau_{eng}$, generator torque $\tau_{gen}$, and motor torque $\tau_{mot}$) are communicated to the Vehicle 206, and provide for torque allocation between the different propulsion sources of the vehicle. Certain data associated with vehicle operating conditions are fed back to the Energy Management Optimization 202 and the Vehicle Control 204. The vehicle operation data serve as feedback to the optimization routine to improve fuel economy. The vehicle operation data includes but is not limited to vehicle speed $V_{spd}$, battery SOC, and distance traveled.

A method to optimize the fuel consumption may require an amount of computation that is greater than the computation bandwidth available in the embedded control module. It is possible to resolve this computational deficiency off-line using a more powerful remote computer system to calculate the optimal operation. However, it may be desirable to implement this control algorithm real-time. A real-time implementation can include an embedded control module that predicts and processes traffic, road information, and driver inputs. The embedded control module may also collect current vehicle status data (battery SOC, vehicle speed, etc.). Real-time implementation may collect and process data such that the processing is without buffering delays. In this way, the output is representative and adaptive to real driving conditions.

During real-time optimization, it may not be practical to determine target SOC setpoints for every moment in time during a route because of the extensive computation requirements. One method of solving this is to divide the route into smaller route segments. An example method of dividing the route is to time divide the route based on available computational bandwidth. One challenge is that a time-based segmentation does not account for characteristics of the route itself. Another example method is to decompose the route into segments that have similar characteristics and attributes. Then, target SOC setpoints can be scheduled for the endpoint of each route segment based on the optimization. The second example of route segmentation shows advantages in generating a real-time fuel consumption estimation method for a given route segment.

Figure 3:
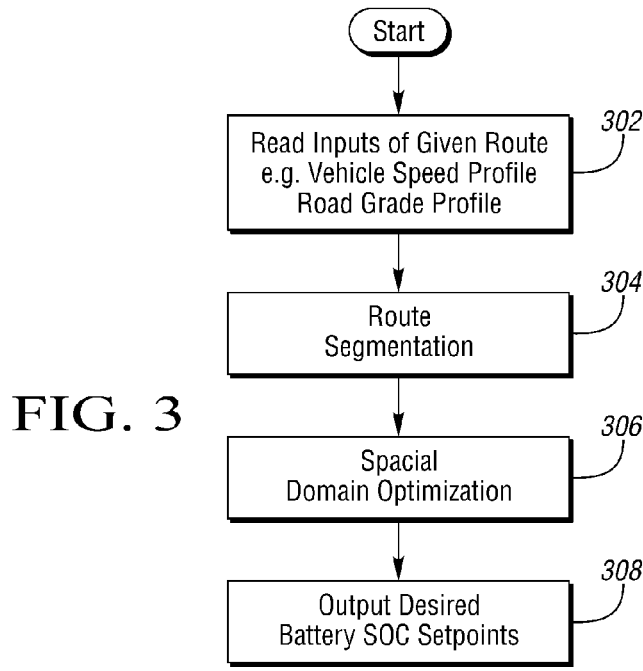
FIG. 3 is a flow chart of a spatial domain hybrid control system with path forecasting.

FIG. 3 is a flow chart illustrating a method of determining target battery SOC setpoints that can be used to control the electric motor(s) 104 and engine 108. The logic of the flow chart may be stored in the PCM 128, or other vehicle controllers, then used optimize vehicle energy management. During step 302, route input data is received. The input may include for example, vehicle speed, road grade, traffic data, weather conditions, and other route information (traffic signs, traffic lights, posted speed limits). At step 304 the route is separated into smaller route segments. The separation into sub-parts may be performed based on user data, predicted data, or information provided wirelessly from remote sources. One or more rules or variants thereof may also be used to govern the segmentation. For example, a vehicle acceleration profile may be used to determine appropriate startpoints and endpoints of each route segment. Vehicle acceleration transitions may be defined by static thresholds (i.e., >0.5 f/s$^2$), by dynamic thresholds (i.e., >5% relative change), or by a combination of thresholds or other criteria including vehicle speed (i.e., >0.5 f/s² @ 0-20 mph).

An alternative rule for segmenting the route at step 304 may include separating the route based on road information. For example, sequential road segments having substantially similar road grade may be grouped in a single route segment. If a road grade change is greater than a predefined threshold, the corresponding spatial location may be identified as a route segment startpoint and/or endpoint. The road grade transitions may be defined by static thresholds (i.e. >0.05% road grade), by dynamic thresholds (i.e., a relative percentage change in road grade), or by a combination of these criteria or other criteria including vehicle speed (i.e. >0.05% @ 0-20 mph). Further, the location of a road grade transition may be determined by either the road grade itself or the derivative of the road grade. The road grade can be used when piecewise constant road grade along the route is provided. The derivative of road grade may be more useful when the road grade provided is more dynamic.

A further option for route segmentation is to separate the route along spatial locations according to driver demand. Requested wheel power and requested vehicle speed may each serve as indictors of driver demand. Certain route attributes may cause predictable or repeating driver demand patterns. For example highway driving versus high traffic driving may each have characteristic driver demand patterns. Similar to the above discussion relative to acceleration and road grade criteria, static and/or dynamic thresholds of driver demand may be used to indicate the location of the start and end of a particular route segment. In at least one embodiment, a route segment startpoint and endpoint is designated by local maximums or minimums of driver demand.

Once a route is segmented, a spatial domain optimizer may be used to schedule target battery SOC setpoints at step 306 by minimizing the total estimated fuel consumption along the route. At step 308 target battery SOC setpoints are output to be used by the Vehicle Control 204 to control the electric motor(s) 104 and engine 108.

Figure 4:
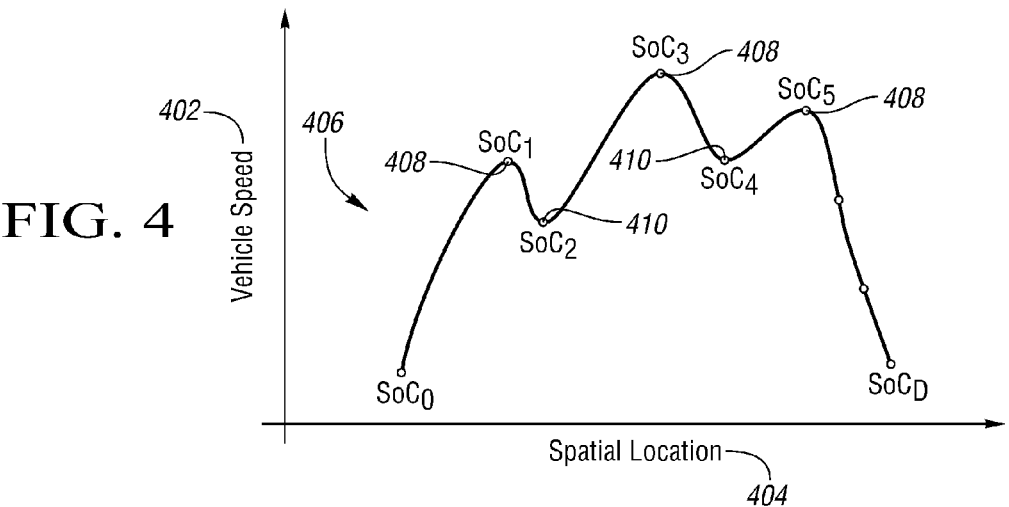
FIG. 4 is a plot illustrating an example of a segmented predetermined route.

FIG. 4 is a plot of an example output of route segmentation. The plot depicts vehicle speed 402 with respect to geographical or spatial location 404. In the example, a predetermined route 406 is divided into segments based on criteria including local maximums 408 and minimums 410 of vehicle speed. Battery SOC targets may also be determined corresponding to the startpoint and endpoint of each route segment in order to minimize the estimated fuel consumption over the entire route. In the example of FIG. 4, state of charge targets $SOC_N$ ($SOC_O$, $SOC_1$, $SOC_2$, $SOC_3$ ... $SOC_D$) are associated with the locations of each startpoint and endpoint of the route segments. $SOC_O$ may represent the state of charge associated with an origin location of the predetermined route. $SOC_D$ may represent the target state of charge associated with a destination of the predetermined route.

Figure 5:
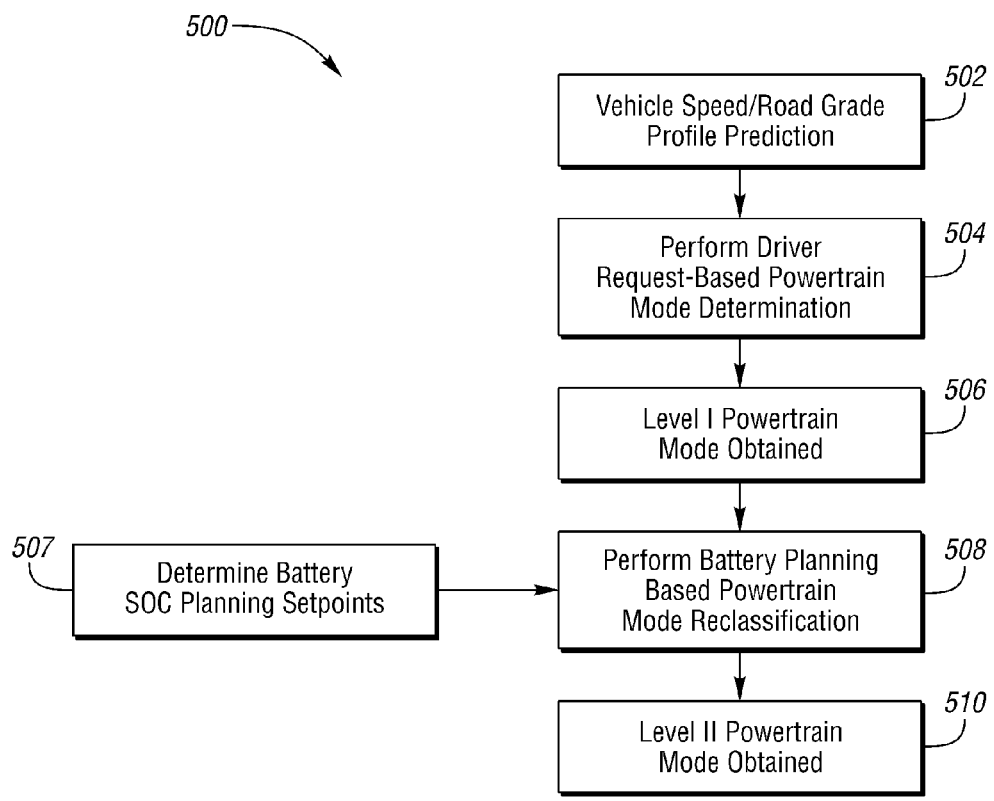
FIG. 5 is a flow chart of a two-level powertrain mode selection forecast method.

The PCM further includes logic to determine powertrain operation modes for each of the predetermined route segments. FIG. 5 generally depicts a method 500 for a two-tiered powertrain mode determination that provides a mode selection that is robust to a wide range of operating conditions. At step 502 predetermined route information is received by the controller as discussed above. Based on forecasted driver demand along the route, a first level of mode selection is conducted at step 504, and a preliminary powertrain mode forecast is generated for each of the route segments. At step 506, this Level I forecasted mode selection is considered in light of the overall battery SOC planning. At step 507 the possible battery SOC planning setpoints are received. At step 508 a second level of powertrain mode selection is performed using the battery SOC planning. The powertrain mode forecast is then output at step 510 as the Level II mode selection. The Level I calculation may not be data intensive if the calculation primarily uses the parameters associated with the startpoints and endpoints of the route segments. The Level II mode selection provides refinement, and may operate to prevent an unreasonable mode selection considering the upcoming battery SOC and power demand over the route. Both levels of forecasting the powertrain mode of operation along a route are discussed in more detail below.

Level I Selection

Figure 6:
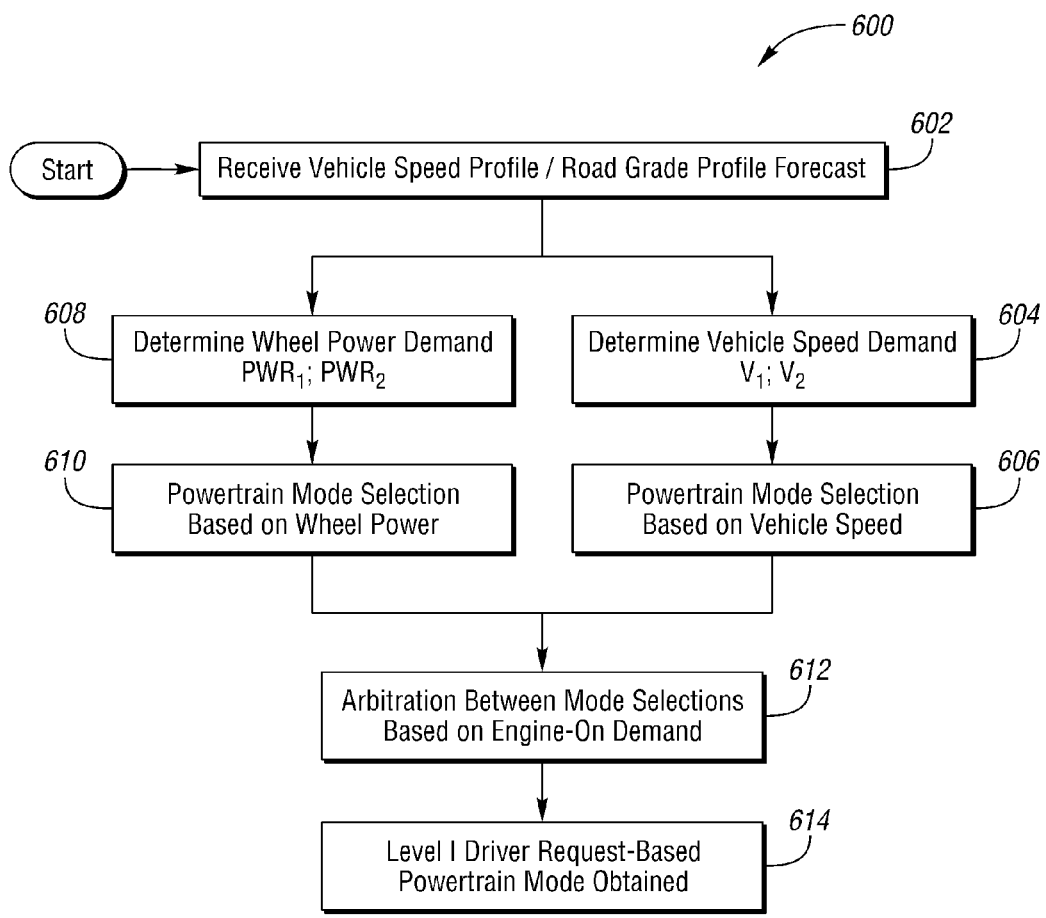
FIG. 6 is a flow chart of a Level I powertrain mode forecast method of FIG. 5.

FIG. 6 is a flow chart of an algorithm illustrating the criteria for the Level I powertrain mode selection. Method 600 is an example of a mode selection process that considers multiple aspects of predicted driver demand in forecasting the mode for a given route segment. Generally, the result of the mode selection falls into one of four powertrain operating scenarios: (1) an electric machine powertrain mode, or "EV mode," (2) hybrid-electric powertrain mode, or "HEV mode," where the engine is activated as the propulsion source, (3) EV→HEV mode where a mode switch occurs during the route segment, and (4) HEV→EV mode also having a mode switch during the route segment. A sufficient change in powertrain operating conditions during the route segment may invoke a mode switch where the engine is activated or deactivated as a propulsion source. The conditions invoking each operating mode are described in more detail below in reference to the subroutines of portions of method 600.

At step 602 information about the predetermined route segment is received. For example, predicted vehicle speed and road grade information may be used in the determination of the powertrain mode for a route segment. Forecasted driver demand is characterized by both wheel power demand as well as vehicle speed demand. The vehicle speed may be predicted over the plurality of route segments based on a combination known influencing factors, including at least road information, traffic information, and/or historical driving patterns. A forecast for vehicle speed is mapped at step 604. $V_1$ and $V_2$ are predicted speeds corresponding to the startpoint and endpoint of the segment, respectively. The speeds are compared to predetermined threshold speeds that govern the particular powertrain operation mode for the segment. A corresponding speed-based powertrain mode is determined at step 606 based on the comparison to the relevant speed thresholds. The mode selection is described in more detail below.

At step 608 a forecast for vehicle wheel power demand is mapped. $PWR_1$ and $PWR_2$ are values indicative of wheel power demand corresponding to the startpoint and endpoint of the segment, respectively. The forecasted wheel power is compared to relevant power thresholds to determine an appropriate powertrain mode for the route segment. At step 610 a wheel power-based powertrain mode is determined based on the comparison.

The two mode selections (step 606 based on speed, and step 610 based on wheel power) are arbitrated against one another at step 612. The different processes for mode selection may result in different forecasted modes, or different forecasted mode switch locations within the route segment. Therefore the Level I mode selection balances the demands of each preliminary subroutine selection. For the arbitration at step 612, the mode selection having a longer engine-on duration will supersede the other mode selection. For example, in the case of both mode selections containing a mode switch, the location of the mode switch may affect the arbitration. Either an earlier engine-on mode switch location or a later engine-off mode switch location may dictate the Level I powertrain mode selection. At step 614 the controller may generate a parameter indicative of the Level I powertrain mode selection for each of the predetermined route segments.

Figure 7:
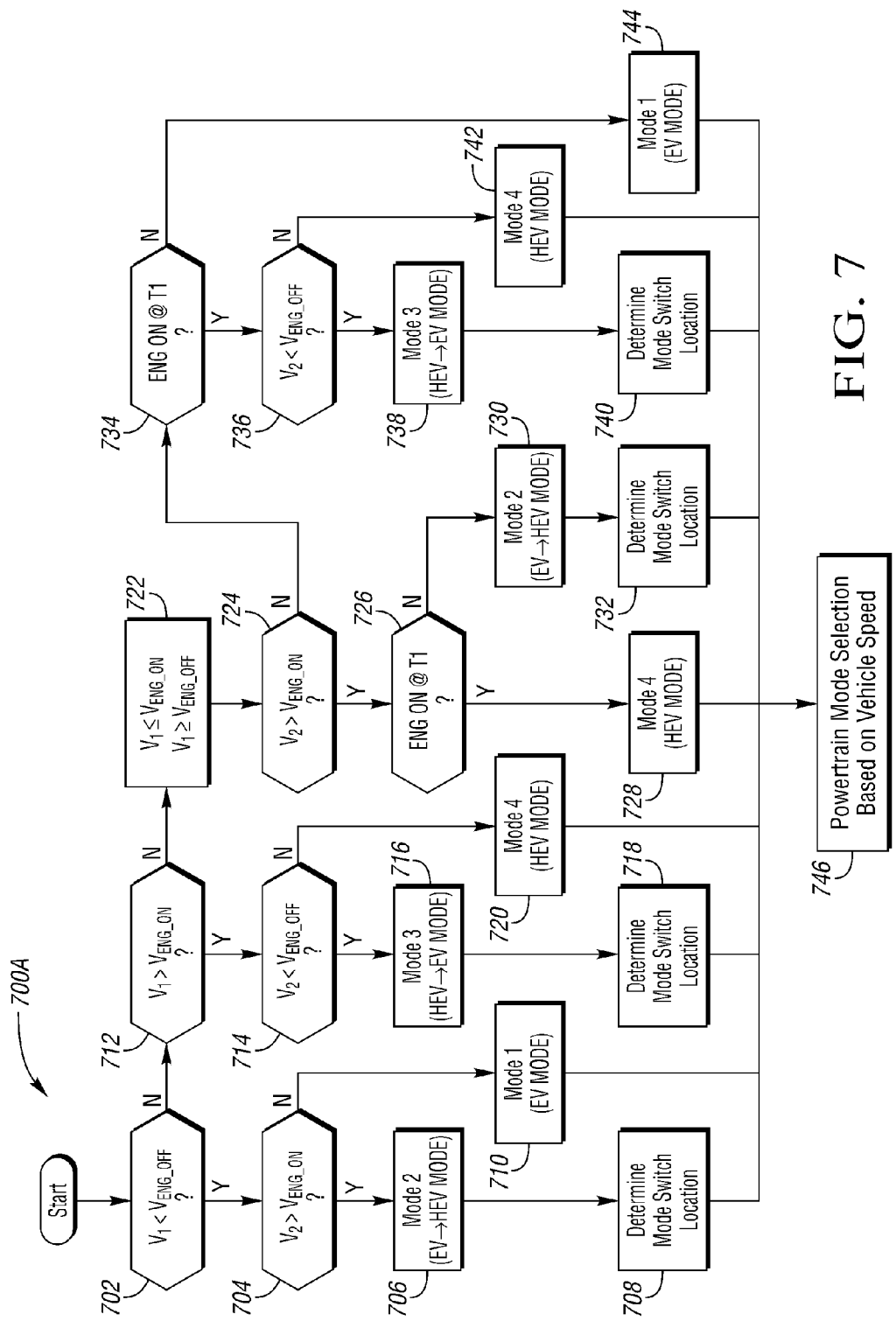
FIG. 7 is a flow chart of a subroutine vehicle speed-based mode selection.

Referring to FIG. 7, the subroutine selection based on vehicle speed is described in more detail. The method 700A shown in FIG. 7 is an example subroutine of the speed-based mode selection described above at step 606. If at step 702, $V_1$ is less than an engine-off speed threshold, the endpoint speed $V_2$ is considered at step 704. If the vehicle speed $V_2$ is greater than an engine-on threshold at the endpoint of the route segment, it is indicative of a sufficient speed increase to prompt an activation of the engine. At step 706 the engine is forecasted to be activated in response to the increase in vehicle speed. In this case the speed increase during the segment is such that the controller may plan for the powertrain to switch modes from EV mode to HEV mode at step 706. At step 708 the location of the mode switch may be determined using the startpoint and endpoint speeds, respectively.

If at step 704 the vehicle speed $V_2$ is less than the engine-on threshold at the endpoint of the route segment, there may not be sufficient speed increase to invoke engine activation. At step 710 the engine is then forecasted to be maintained in EV mode.

If at step 702 $V_1$ is greater than an engine-off speed threshold, the controller may consider at step 712 whether $V_1$ is greater than an engine-on speed threshold. If $V_1$ is greater than the engine-on speed threshold at the startpoint, the controller considers at step 714 whether there is a sufficient speed decrease to prompt a deactivation of the engine. If $V_2$ is less than an engine-off threshold at step 714, the controller may plan at step 716 for the powertrain to switch modes from HEV mode to EV mode during the route segment. The speed decrease in this case is sufficient to no longer require an engine assist, and therefore transition from HEV mode to EV mode. In at least one embodiment, the engine-on threshold is greater than the engine-off threshold to provide a hysteresis effect. Separation between the two thresholds helps to avoid a rapid succession of turning the engine on and off due to speed fluctuations across one of the thresholds. The location of the mode switch may be determined by the controller at step 718 for later use.

If at step 714 $V_2$ is greater that the engine-off threshold, there may not be enough of a decrease in speed to warrant deactivation of the engine. The controller may plan at step 720 for the powertrain to remain in HEV mode during the route segment.

If at step 712 $V_1$ is less than the engine-on speed threshold, the controller considers at step 722 the case where $V_1$ is between the engine-on and the engine-off speed thresholds. In this case, the powertrain operating mode of the previous route segment is relevant to the mode selection. If there is sufficient speed increase during the segment at step 724 such that $V_2$ is greater that the engine-on threshold, the controller next considers the powertrain operating mode during the previous route segment. At step 726, if the engine was already active at $T_1$, the controller may forecast to remain in HEV mode at step 728. Conversely, at step 726 if the engine was inactive at $T_1$, the controller may forecast at step 730 a mode switch during the route segment from EV mode to HEV mode. Like other selections including a powertrain mode switch, the controller may determine at step 732 the location of the mode switch for subsequent use.

If at step 724, $V_2$ is less than the engine-on threshold, the controller considers the operating mode of the previous route segment at step 734. If the engine was already active at $T_1$ from the previous route segment, the controller considers at step 736 whether there is a speed decrease sufficient to cause the engine to be deactivated. If $V_2$ is less than the engine-off threshold, the controller may forecast at step 738 that the powertrain will switch modes from HEV mode to EV mode during the route segment. Similar to other selections including a powertrain mode switch, the controller may determine at step 740 the location of the mode switch for subsequent use.

Conversely, if at step 736 $V_2$ is greater than the engine-off threshold, the speed decrease may not be sufficient to warrant deactivating the engine. At step 742 the controller may forecast the powertrain to remain in HEV mode. If at step 734 the engine is not on at $T_1$ from the previous route segment, the controller may forecast at step 744 for the powertrain to remain in EV mode. The vehicle speed-based powertrain mode is selected at 746.

Figure 8:
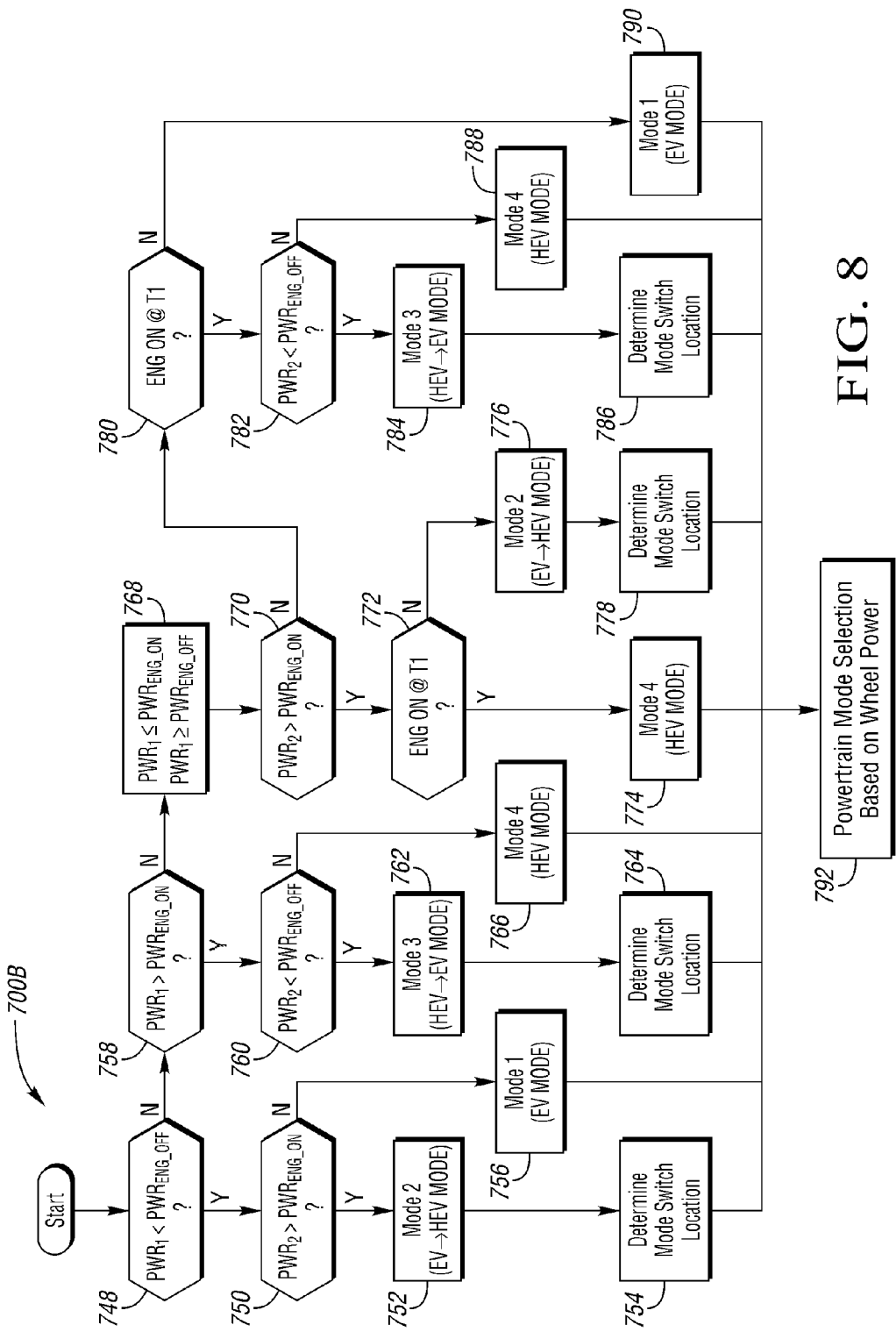
FIG. 8 is a flow chart of a subroutine wheel power-based mode selection.

FIG. 8 depicts the subroutine powertrain mode selection based on predicted wheel power demand. The wheel power-based selection of method 700B corresponds to step 610 of the arbitration procedure discussed above, and may be performed concurrently with the selection based on vehicle speed.

As mentioned above, $PWR_1$ and $PWR_2$ are values indicative of wheel power demand corresponding to the startpoint and endpoint of the segment, respectively. If at step 748, $PWR_1$ is less than an engine-off power threshold, the endpoint power $PWR_2$ is considered at step 750. If the predicted wheel power demand $PWR_2$ is greater than an engine-on threshold at the endpoint of the route segment, it is indicative of a sufficient wheel power demand increase to prompt an activation of the engine. At step 752 the engine is forecasted to be activated in response to the increase in wheel power demand. In this case the wheel power increase during the segment is such that the controller may plan for the powertrain to switch modes from EV mode to HEV mode at step 752. At step 754 the location of the mode switch may be determined using the startpoint and endpoint speeds, respectively.

If at step 750 the wheel power $PWR_2$ is less than the engine-on threshold at the endpoint of the route segment, there may not be sufficient increase in wheel power demand to invoke engine activation. At step 756 the engine is then forecasted to be maintained in EV mode.

If at step 748 $PWR_1$ is greater than an engine-off power threshold, the controller may consider at step 758 whether $PWR_1$ is greater than an engine-on power threshold. If $PWR_1$ is greater than the engine-on power threshold at the startpoint, the controller considers at step 760 whether there is a sufficient decrease in wheel power demand to prompt a deactivation of the engine. If $PWR_2$ is less than an engine-off threshold at step 760, the controller may plan at step 762 for the powertrain to switch modes from HEV mode to EV mode during the route segment. The decrease in wheel power in this case is sufficient to no longer require an engine assist, and therefore transition from HEV mode to EV mode. In at least one embodiment, the engine-on threshold is greater than the engine-off threshold to provide a hysteresis effect. Separation between the two thresholds helps to avoid a rapid succession of turning the engine on and off due to wheel power fluctuations across one of the thresholds. The location of the mode switch may be determined by the controller at step 764 for later use.

If at step 760 $PWR_2$ is greater that the engine-off threshold, there may not be enough of a decrease in wheel power demand to warrant deactivation of the engine. The controller may plan at step 766 for the powertrain to remain in HEV mode during the route segment.

If at step 758 $PWR_1$ is less than the engine-on wheel power threshold, the controller considers at step 768 the case where $PWR_1$ is between the engine-on and the engine-off wheel power thresholds. In this case, the powertrain operating mode of the previous route segment is relevant to the mode selection. If there is sufficient wheel power increase during the segment at step 770 such that $PWR_2$ is greater that the engine-on threshold, the controller next considers the powertrain operating mode during the previous route segment. At step 772, if the engine was already active at $T_1$, the controller may forecast to remain in HEV mode at step 774. Conversely, at step 772 if the engine was inactive at $T_1$, the controller may forecast at step 776 a mode switch during the route segment from EV mode to HEV mode. Like other selections including a powertrain mode switch, the controller may determine at step 778 the location of the mode switch for subsequent use.

If at step 770, $PWR_2$ is less than the engine-on threshold, the controller considers the operating mode of the previous route segment at step 780. If the engine was already active at $T_1$ from the previous route segment, the controller considers at step 782 whether there is a wheel power demand decrease sufficient to allow the engine to be deactivated. If $PWR_2$ is less than the engine-off threshold, the controller may forecast at step 784 that the powertrain will switch modes from HEV mode to EV mode during the route segment. Similar to other selections including a powertrain mode switch, the controller may determine at step 786 the location of the mode switch for subsequent use.

Conversely, if at step 782 $PWR_2$ is greater than the engine-off threshold, the decrease in wheel power demand may not be sufficient to warrant deactivating the engine. At step 788 the controller may forecast the powertrain to remain in HEV mode. If at step 780 the engine is not on at $T_1$ from the previous route segment, the controller may forecast at step 790 that the powertrain will remain in EV mode. The wheel power-based powertrain mode is selected at 792.

In both mode determination subroutines, if a switching mode is selected (EV→HEV or HEV→EV) the location of the mode switch is calculated at the respective step discussed above. The controller may determine the location of the mode switch point based on the data associated with the startpoint and endpoint of the route segment. In one example, the controller may approximate the location of the mode switch by linear interpolation between the startpoint and the endpoint. The magnitude of the judgment criteria (either speed or wheel power) is compared at both locations against the value of the threshold that was crossed during the route segment. Assuming a straight line between the data points, the switching location where the threshold was crossed may be calculated. In another example, the controller may identify the location of the mode switch point with a bisection method that iteratively bisects an interval until the location is found where the magnitude of the judgment criteria (e.g. wheel power) meets the value of the threshold. The above methods of approximating the mode switch based on the end points may reduce the computational load of the controller compared to instantaneous data sampling by the controller to determine the location of the powertrain mode switch.

Once the powertrain mode is selected according to the subroutines of method 700A and method 700B, the mode determination based on vehicle speed may be arbitrated against the mode selection based on wheel power demand.

The plots shown in FIGS. 9A through 9C depict visual examples of the Level I vehicle speed-based mode selection subroutine discussed above. In each of the plots, the vertical axis represents vehicle speed 802. The horizontal axis represents spatial location 804 along the route segment. $L_1$ and $L_2$ represent the respective locations of the startpoint and the endpoint of the route segment.

Two curves are shown on the plot of FIG. 9A, where each represents a different powertrain operating condition during a route segment. Both conditions include that the vehicle speed $V_1$ at the beginning of the segment is greater than both powertrain mode switch thresholds. The ultimate powertrain mode forecast for the segment is influenced by the speed at the end of the route segment, $V_2$. Curve 806 is a first example operating condition showing that the vehicle speed at both $L_1$ and $L_2$ is greater than the engine-on threshold 808 for the given condition. In this case operation according to curve 806 would correspond to a controller mode forecast to remain in HEV mode where the engine is active as a propulsion source throughout the route segment. Curve 810 is a second example operating condition showing that the vehicle speed changes between $L_1$ and $L_2$ such that the speed decreases to cross the engine-off threshold 812 during the route segment. Curve 810 corresponds to operating conditions that would prompt a HEV→EV mode selection. Point 814 corresponds to the location of a powertrain mode switch. As discussed above, this location may be approximated by interpolation for example. The HEV→EV mode forecast may further prompt the controller to subdivide the route segment between $L_1$ and $L_2$ into two smaller sub-segments. In the example of curve 810, the first sub-segment between $L_1$ and $L_{MODE\ SWITCH}$ corresponds to an HEV mode operating above the engine-off threshold 812. The second sub-segment between $L_{MODE\ SWITCH}$ and $L_2$ corresponds to EV mode where the vehicle speed is less than the engine-off threshold 812.

FIG. 9B is a second plot that similarly depicts a pair of curves each having different powertrain operating conditions. The vertical axis and horizontal axis represent vehicle speed 802 and spatial location 804 respectively. Curve 816 is an example showing that the vehicle speed at both $L_1$ and $L_2$ is less than both powertrain mode switch thresholds for the route segment. In this case, powertrain operation according to curve 816 would correspond to a controller mode forecast to remain in EV mode where the engine remains inactive and the electric machine provides the vehicle propulsion. Curve 818 represents a different operating condition where vehicle speed increases during the segment to greater than the engine-on threshold 808. Curve 818 corresponds to an operating condition that would prompt a EV→HEV mode forecast, and point 820 corresponds to the location of the powertrain mode switch.

FIG. 9C is a third plot of the powertrain mode forecast based on vehicle speed. In this plot several operating curves are shown, where each has a vehicle speed $V_1$ at the beginning of the segment that is between the engine-on threshold 808 and the engine-off threshold 812. In this case, not only does the speed $V_2$ at the end of the segment influence the forecasted powertrain mode, but the controller additionally must consider the powertrain mode forecasted for the previous route segment.

Curve 822 shows an increase in vehicle speed such that the speed $V_2$ at the endpoint $L_2$ is greater than the engine-on threshold 808. The mode switch location corresponds to point 824. In this case if the engine was forecasted to be active at the end of the previous route segment, the forecast for the current segment will be to remain in HEV mode. In contrast, if the previous segment was forecasted to be in EV mode, the powertrain mode forecast current for the current route segment will be EV→HEV mode.

Curve 826 represents an operating condition where the vehicle speed remains between both powertrain mode switch thresholds for the duration of the segment. In this case the mode forecast will be that the powertrain will remain in the same mode as the previous route segment.

Curve 828 depicts a third operating condition where the vehicle speed decreases to be less than the engine-off threshold 812 at the endpoint $L_2$ of the route segment. The operating condition corresponding to curve 828 invokes a powertrain mode forecast where the engine is disabled at the endpoint of the route segment. If the engine was on at the end of the previous route segment, the forecast of the current segment will be HEV→EV mode. The location of the mode switch corresponds to point 830. On the other hand, if the engine was off at the end of the previous route segment, the forecast for the current segment will be to remain in EV mode for the duration of the segment.

FIGS. 10A through 10C depict the operating conditions according to the wheel power-based powertrain forecasted mode selection. In each of the plots, the vertical axis represents predicted wheel power demand 832. The horizontal axis represents the location 804 along the route segment. $L_1$ and $L_2$ represent the respective locations of the startpoint and the endpoint of the route segment. Similar to the vehicle speed-based selection described above, the wheel power forecasted values at the startpoint $L_1$ and endpoint $L_2$ are compared to relevant engine-on and engine-off thresholds. It should be appreciated that wheel power powertrain mode switch thresholds are not constant, and may vary according to vehicle speed. By way of example, the depiction shown in FIGS. 10A through 10C shows decreasing thresholds which may correspond to a decrease or increase in vehicle speed during the route segment.

Referring to FIG. 10A, two curves are shown, each representing a different powertrain operating condition during a route segment. Both conditions include that the wheel power $PWR_1$ at the beginning of the segment is greater than both engine mode switch thresholds. The powertrain mode forecast for the segment is influenced by the wheel power $PWR_2$ at the end of the route segment. Curve 834 is a first example operating condition showing that the wheel power at both $L_1$ and $L_2$ is greater than the engine-on threshold 836 for the given condition. In this case operation according to curve 834 would correspond to a controller mode forecast to remain in HEV mode where the engine is active as a vehicle propulsion source throughout the route segment. Curve 838 is a second example operating condition showing that the wheel power changes between $L_1$ and $L_2$ such that the wheel power decreases to cross the engine-off threshold 840 during the route segment. Curve 838 corresponds to operating conditions that would prompt a HEV→EV mode selection. Point 842 corresponds to the location of a powertrain mode switch. As discussed above, this location may be approximated by interpolation, or by bisecting of the route segment for example. The HEV→EV mode forecast may further prompt the controller to subdivide the route segment between $L_1$ and $L_2$ into two smaller sub-segments. In the example of curve 838, the first sub-segment between $L_1$ and $L_{MODE\ SWITCH}$ corresponds to an HEV mode operating above the engine-off threshold 840. The second sub-segment between $L_{MODE\ SWITCH}$ and $L_2$ corresponds to EV mode where the wheel power is less than the engine-off threshold 840.

FIG. 10B is a second plot that similarly depicts a pair of curves each having different powertrain operating conditions. The vertical axis and horizontal axis represent wheel power 832 and spatial location 804 respectively. Curve 844 is an example showing that the wheel power at both $L_1$ and $L_2$ is less than both powertrain mode switch thresholds for the route segment. In this case, powertrain operation according to curve 844 would correspond to a controller mode forecast to remain in EV mode where the engine remains inactive and the electric machine provides the vehicle propulsion. Curve 846 represents a different operating condition where wheel power increases during the segment to greater than the engine-on threshold 836. Curve 846 corresponds to an operating condition that would prompt a EV→HEV mode forecast, and point 848 corresponds to the location of the powertrain mode switch.

FIG. 10C is a third plot of the powertrain mode forecast based on forecasted wheel power. In this plot several operating curves are shown, where each has a wheel power at the beginning of the segment that is between the engine-on threshold 836 and the engine-off threshold 840. In this case, not only does the wheel power $PWR_2$ at the endpoint of the segment influence the forecasted operating condition, but the controller additionally must consider the powertrain mode forecasted for the previous route segment.

Curve 850 shows an increase in wheel power such that the wheel power $PWR_2$ at the endpoint $L_2$ is greater than the engine-on threshold 836. The mode switch location corresponds to point 852. In this case if the engine was forecasted to be on in the previous route segment, the forecast for the current segment will be to remain in HEV mode. In contrast, if the previous segment was forecasted to be in EV mode, the powertrain mode forecast current for the current route segment will be EV→HEV mode.

Curve 854 represents an operating condition where the wheel power remains between both powertrain mode switch thresholds for the duration of the segment. In this case the mode forecast will be that the powertrain will remain in the same mode that was forecasted for the endpoint of the previous route segment.

Curve 856 depicts a third operating condition where the forecasted wheel power decreases to be less than the engine-off threshold 840 at the endpoint $L_2$ of the route segment. The operating condition corresponding to curve 856 invokes a powertrain mode forecast where the engine is disabled at the endpoint of the route segment. If the engine was active at the end of the previous route segment, the forecast of the current segment will be HEV→EV mode. The location of the mode switch corresponds to point 858. On the other hand, if the engine was inactive at the end of the previous route segment, the forecast for the current segment will be to remain in EV mode for the duration of the segment.

As discussed above, if a EV→HEV mode or a HEV→EV mode are selected, the route segment may be further subdivided at the location of the powertrain mode switch into two smaller sub-segments. The sub-segments are split such that each has a single powertrain operation mode with no mode switch. That is, there is no change in engine activation during each of the subdivided route segments. Employing a subdivision procedure during the Level I selection may result in all route segments being parsed to either EV or HEV modes.

Level II Selection

The controller may enter a reclassification algorithm to further refine the powertrain mode forecast once the Level I mode is selected. A Level II mode selection considers the battery state of charge planning over the course of the entire route for the powertrain mode selection for each of the plurality of route segments. The Level II selection may include reclassification to the previously forecasted mode selections to reflect that the battery SOC planning, once realized in the vehicle, will impact the engine power demand. The reclassification ensures no unreasonable planning as a result of the Level I mode selection based on driver demand.

Figures 11, 12:
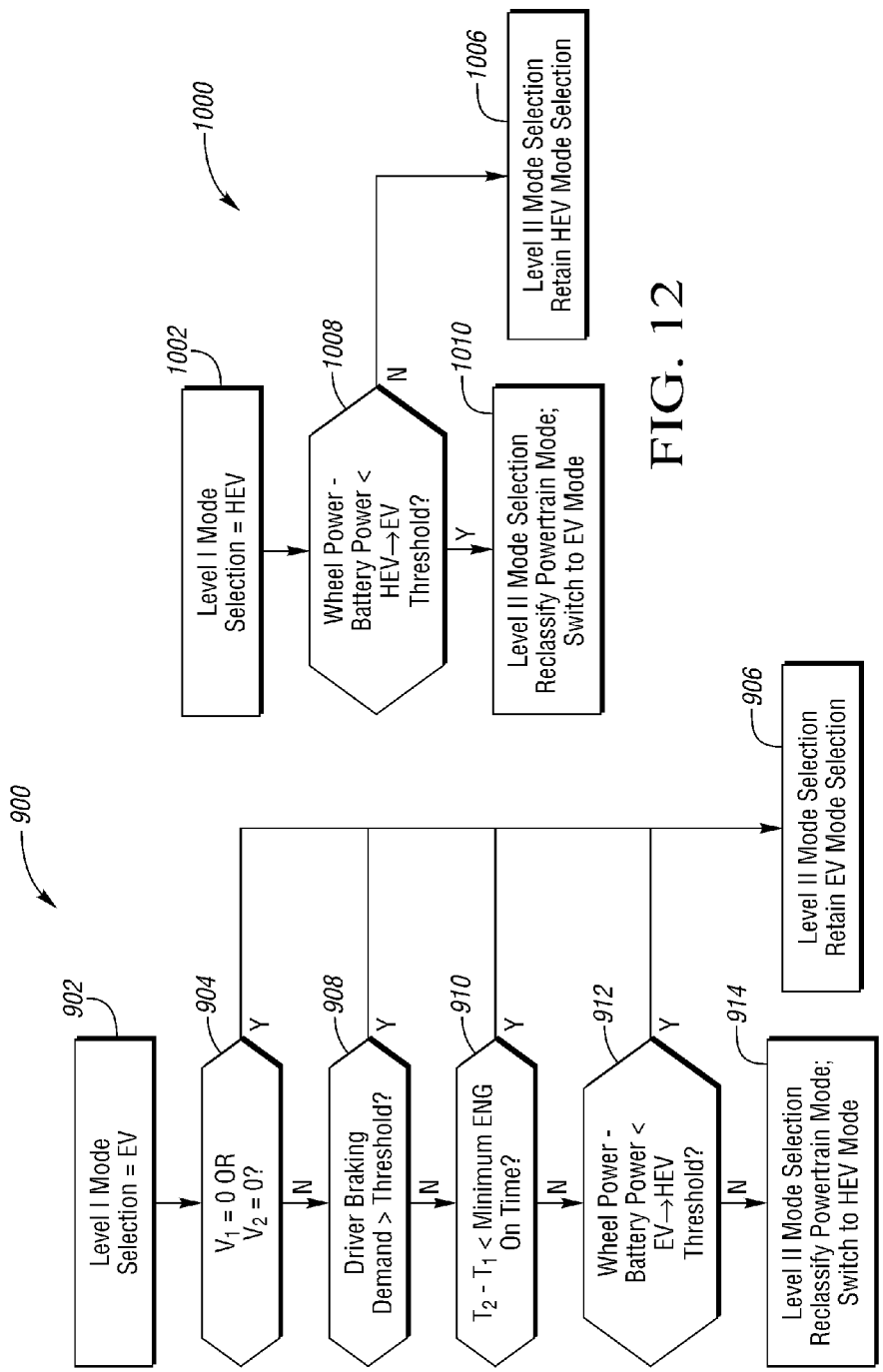
FIG. 11 is a flow chart of a Level II powertrain mode forecast method of FIG. 5.
FIG. 12 is a flow chart of an alternate Level II powertrain mode forecast method of FIG. 5.

FIG. 11 illustrates a Level II mode selection method 900 when EV mode is an output of the Level I selection. There are several conditions that either confirm the selection, or trigger a reclassification into a different powertrain mode. Route segments with certain vehicle speed profiles, wheel power demand, and time duration will planned to be kept in EV mode in spite of the Level I powertrain mode forecast. Aside from these conditions, if a significant battery charge is planned for the route segment, which increases the engine power request, then the mode can be re-classified as HEV mode. At step 902 the Level I selection is input into the algorithm. If the forecasted vehicle speed is zero at either the startpoint or the endpoint of the route segment at step 904, the EV mode selection is confirmed at step 906. Once the EV mode is confirmed, the controller plans that the engine will be kept inactive during the route segment. If at step 904 the vehicle speed is not zero at either endpoint, the controller next considers whether the driver requests the vehicle to decelerate. If forecasted driver deceleration demand for the route segment is greater than a predetermined braking threshold at step 908, EV mode is confirmed at step 906. Similarly, if the route segment is sufficiently short EV mode is confirmed. At step 910 if the time duration of the route segment, $T_2-T_1$, is less than a predetermined minimum engine-on time threshold, the controller issues a command to confirm the planned EV mode selection. At step 912 the controller considers whether the forecasted wheel demanded power over the segment is sufficiently greater than the battery power required to activate the engine for power assist and/or battery recharge. If the difference between the forecasted wheel demanded power and the forecasted battery power is less than a predetermined EV→HEV threshold at step 912, the battery power is sufficient to plan to remain in EV mode in step 906. If none of the above-described thresholds are met, and the wheel power demand relative to the available battery power may be great enough to cause the controller to reclassify the Level I mode forecast at step 914, and change from planning for EV mode to planning for HEV mode for the given route segment.

FIG. 12 illustrates a Level II mode forecast method 1000 when HEV mode is an output of the Level I selection. At step 1002 the Level I powertrain mode selection for the route segment is received. Under certain conditions, a high battery SOC entering the route segment may warrant planning for dissipation of some battery energy irrespective of the forecasted wheel power demand. At step 1008 if the difference between wheel power demand and available battery power is less than a HEV→EV power threshold, the controller may issue a signal at step 1010 to cause a reclassification of the previous HEV mode forecast. The mode may be reclassified as EV mode, and the controller may therefore plan to keep the engine inactive during the route segment.

The two-level powertrain mode determination procedure described above will have more freedom for SOC planning in cases where the EV mode is reclassified as HEV mode. As the whole procedure is part of the Energy Management Optimization, a predicted HEV mode will allow more optimization opportunities for the battery SOC planning. Additionally, when HEV mode is reclassified as EV mode, unnecessary estimation of fuel consumption associated with each route segment with HEV can be avoided.

The present disclosure provides representative control strategies and/or logic that may be implemented using one or more processing strategies such as event-driven, interrupt-driven, multi-tasking, multi-threading, and the like. As such, various steps or functions illustrated herein may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but it is provided for ease of illustration and description.

The control logic may be implemented primarily in software executed by a microprocessor-based vehicle, engine, and/or powertrain controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a powertrain having an engine and an electric machine;
a battery configured to power the electric machine; and
a controller programmed to operate the powertrain according to a forecasted torque allocation between the engine and the electric machine (i) generated for each of a plurality of predetermined route segments based on predicted driver demand and (ii) confirmed for each of the route segments based on a target battery state of charge corresponding to an endpoint of the route segment while an actual state of charge is within a threshold value of the target battery state of charge.

2. The vehicle of claim 1 wherein each of the plurality of predetermined route segments are further defined by a startpoint and the endpoint corresponding to changes in predicted driver demand.

3. The vehicle of claim 2 wherein the controller is further programmed to forecast an activation of the engine during an electric machine powertrain mode in response to the predicted driver demand increasing to greater than a first predetermined threshold during one of the plurality of route segments.

4. The vehicle of claim 2 wherein the controller is further programmed to forecast a deactivation of the engine during a hybrid-electric powertrain mode in response to the predicted driver demand decreasing to less than a second predetermined threshold during one of the plurality of route segments.

5. The vehicle of claim 1 wherein the controller is further programmed to subdivide a route segment if a powertrain mode switch is forecasted during the route segment such that the subdivided route segment includes no powertrain mode switch.

6. The vehicle of claim 1 wherein the driver demand comprises at least one of a vehicle speed demand and a wheel power demand, and the forecasted torque allocation is based on the one of the vehicle speed demand or the wheel power demand that causes a longer engine-on duration during a route segment relative to the other of the vehicle speed demand or the wheel power demand.

7. The vehicle of claim 1 wherein the controller is further programmed to affirm an electric machine powertrain mode forecast for one of the plurality of route segments in response to vehicle speed being equal to zero at either a startpoint or the endpoint of the route segment.

8. The vehicle of claim 1 wherein the controller is further programmed to affirm an electric machine powertrain mode forecast for one of the plurality of route segments in response to a time duration of the route segment being less than a predetermined engine-on time threshold.

9. The vehicle of claim 1 wherein the controller is further programmed to affirm an electric machine powertrain mode forecast for one of the plurality of route segments in response to driver deceleration demand being greater than a predetermined braking threshold.

10. The vehicle of claim 1 wherein the controller is further programmed to affirm an electric machine powertrain mode forecast for one of the plurality of route segments in response to a difference between a predicted wheel power and available battery power being less than an engine-on threshold.

11. A method for operating a hybrid-electric powertrain comprising:
    allocating a forecasted torque demand between a motor and an engine for a plurality of segments of a predetermined route based on one of a predicted vehicle speed and a predicted wheel power; and
    selectively activating the engine at locations along the predetermined route such that a target battery state of charge corresponding to an endpoint of each of the segments is achieved.

12. The method of claim 11 further comprising subdividing a segment of the predetermined route if the engine is activated or deactivated during the route segment such that there is no change in engine activation during each of the subdivided route segments.

13. The method of claim 11 further comprising forecasting the engine to remain inactive during a segment of the predetermined route in response to predicted vehicle speed being equal to zero at either a startpoint or an endpoint of the segment.

14. The method of claim 11 further comprising forecasting the engine to remain inactive during a segment of the predetermined route in response to a predicted driver deceleration demand being greater than a predetermined braking threshold during the segment.

15. The method of claim 11 further comprising forecasting the engine to remain inactive during a segment of the predetermined route in response to a time duration of the segment being less than a minimum engine-on time threshold.

16. The method of claim 11 further comprising forecasting the engine to be deactivated during a segment of the predetermined route in response to a forecasted battery discharge event during the segment.

17. A vehicle comprising:
    a powertrain having an engine and an electric machine;
    a battery configured to power the electric machine; and
    a controller programmed to (i) forecast a change in an activation state of the engine during any of a plurality of predetermined route segments in response to predicted driver demand crossing a predetermined threshold during the route segment, (ii) monitor a state of charge of the battery, and (iii) forecast a torque output allocation between the engine and the electric machine such that a target state of charge is achieved at an endpoint of each of the predetermined route segments.

18. The vehicle of claim 17 wherein the driver demand comprises at least one of a vehicle speed demand and a wheel power demand, and the forecasted torque output allocation is based on the one of a vehicle speed demand or a wheel power demand that causes a longer engine-on duration during a route segment relative to the other of the vehicle speed demand or the wheel power demand.

19. The vehicle of claim 17 wherein the controller is further programmed to forecast the engine to remain inactive during a segment in response to a time duration of the route segment being less than a minimum engine-on time threshold.

20. The vehicle of claim 17 wherein the controller is further programmed to forecast the engine to remain inactive during a route segment in response to predicted vehicle speed being equal to zero at either a startpoint or the endpoint of the route segment.

* * * * *